(12) United States Patent
Dunning et al.

(10) Patent No.: US 12,710,534 B2
(45) Date of Patent: Aug. 18, 2026

(54) LIDAR WITH PHOTON-RESOLVING DETECTOR

(71) Applicant: ID Quantique SA, Carouge (CH)

(72) Inventors: Alexander Dunning, Keynsham (GB); Gianluca Boso, Carouge (CH); Felix Bussieres, Vessy (CH)

(73) Assignee: ID QUANTIQUE SA, Carouge (CH)

( * ) Notice: Subject to any disclaimer, the term of this patent is extended or adjusted under 35 U.S.C. 154(b) by 1026 days.

(21) Appl. No.: 17/782,711

(22) PCT Filed: Dec. 2, 2020

(86) PCT No.: PCT/EP2020/084287
§ 371 (c)(1),
(2) Date: Jun. 6, 2022

(87) PCT Pub. No.: WO2021/110752
PCT Pub. Date: Jun. 10, 2021

(65) Prior Publication Data

US 2023/0007979 A1 Jan. 12, 2023

(30) Foreign Application Priority Data

Dec. 6, 2019 (EP) .................................... 19214065

(51) Int. Cl.
*G01S 17/18* (2020.01)
*G01S 7/487* (2006.01)
*G01S 17/931* (2020.01)

(52) U.S. Cl.
CPC ........... *G01S 17/18* (2020.01); *G01S 7/4873* (2013.01); *G01S 17/931* (2020.01)

(58) Field of Classification Search
None
See application file for complete search history.

(56) References Cited

U.S. PATENT DOCUMENTS

2003/0218919 A1* 11/2003 Arita ....................... G01S 17/42 365/200
2017/0234973 A1 8/2017 Axelsson
2018/0120441 A1 5/2018 Elooz et al.
(Continued)

OTHER PUBLICATIONS

"Amplification Technologies Announces New Eye-Safe Discrete Amplification Geiger-Mode Arrays for 3D LIDAR Applications" Marketwired , Apr. 15, 2016, accessed online on Sep. 4, 2025 at https://finance.yahoo.com/news/amplification-technologies-announces-eye-safe-210044175.html?guccounter=1&g (Year: 2016).*
(Continued)

*Primary Examiner* — Eric L Bolda
(74) *Attorney, Agent, or Firm* — Millen, White, Zelano & Branigan P.C.; William F. Nixon

(57) ABSTRACT

The present invention relates to a lidar (1000) comprising an emitter (1100) and a receiver (1200), wherein the receiver (1200) comprises a discrete amplification photon detector (1210), wherein the receiver (1200) comprises a discriminator (1220), wherein the discriminator (1220) has an input connected to an output signal of the discrete amplification photon detector (1210), and wherein the discriminator (1220) is configured to output a signal indicating that the output signal of the discrete amplification photon detector (1210) is higher than a predetermined threshold.

9 Claims, 3 Drawing Sheets

(56) References Cited

U.S. PATENT DOCUMENTS

| | | | |
|---|---|---|---|
| 2018/0259625 A1 | 9/2018 | Gnecchi et al. | |
| 2019/0293769 A1 | 9/2019 | Subasingha et al. | |
| 2020/0034644 A1* | 1/2020 | Paesen | G01S 17/894 |
| 2020/0400816 A1* | 12/2020 | Sugae | G01S 17/26 |

OTHER PUBLICATIONS

Marketwired (Year: 2016).*
Korean Office Action dated Sep. 5, 2025 issued in corresponding application 10-2022-7023209.
Cohen Lior et al: "Thresholded Quantum LIDAR—Exploiting Photon-Number-Resolving Detection", Phys. Rev. Lett. 123, 203601, Oct. 18, 2019.
Preliminary Specifications. DAPDNIR-5x5-1550-100-300 Discrete Amplification Photon Detector 5x5 Stand-Alone Array, 2016.
International Search Report dated Jan. 25, 2021 issued in corresponding PCT/EP2020/084287 application (3 pages).
Written Opinion dated Jan. 25, 2021 issued in corresponding PCT/EP2020/084287 application (5 pages).
Korean Office Action dated Jun. 6, 2026 issued in corresponding application 10-2022-7023209.

* cited by examiner

1000
OBJ
1100
1210
1200
1220

| 13 | 14 | 16 | 18 | 20 |
|---|---|---|---|---|
| 11 | 12 | 17 | 19 | 21 |
| 10 | 9 | 15 | 22 | 23 |
| 8 | 7 | 4 | 1 | 24 |
| 6 | 5 | 3 | 2 | 25 |

LIDAR WITH PHOTON-RESOLVING DETECTOR

The present invention generally relates to a lidar employing a photon-number-resolving detector. In particular, the invention relates to a lidar using a discrete amplification photon detector as detector.

BACKGROUND OF THE INVENTION

The basic principle of a lidar is the measurement of the round-trip time of a light pulse, for instance a laser pulse, which is scattered from a target back into the receiver, in order to determine the distance between the lidar and the target. Lidars are finding a common use, for instance, in autonomous vehicles. This use requires the lidar to emit as little light as possible, for instance due to safety requirements, power consumptions, energy requirements, etc. Moreover, the light is transmitted in various, unexpected, weather and environmental conditions. This may result in very little light being scattered back to the receiver. It is thus necessary to employ a receiver capable of detecting very low amount of light. Additionally, in applications such as gas sensing, a lidar may be forced to work with a very small reflected signal, due to the nature of the reflection object, namely the molecules of gas.

Single-photon detectors enable lidar measurements with very low intensities as compared with traditional photodetectors. In principle, a single-photon detector outputs an electrical pulse when a photon arrives at the detector, with a probability that is dependent upon the properties of the detector. This will be referred in the following as "clicking", meaning that when the single-photon detector "clicks" it outputs a signal indicating one or more photons have reached the detector.

However, single-photon detectors may suffer from false positive signals due to noise. This noise, in lidar systems, can particularly comprise light not generated form the lidar itself and/or thermal noise in the detector. In the first case light reaching the detector may be, for instance, solar radiation, light emitted from another lidar in the proximity, or more generally light from a source with emission characteristics covering the functional range of the detector. In the second case, thermal noise may result in the single-photon detector clicking even in the absence of any light being received. For a typical single-photon detector, such as a single-photon avalanche diode (SPAD), a click due to noise is indistinguishable from a click due to a lidar event. This makes it difficult to trust the signal outputted by the SPAD. Moreover, typical SPADs have a dead time after a detection event, which prevents consecutive detection events within a predetermined time window. This limits the time resolution of the lidar, since no measurement can occur during the dead time.

Those problems severely limits the performance of SPAD-based single-photon lidar systems.

Lidars according to the prior art are known, for instance, from:

"*Smart three-dimensional imaging lidar using two Geiger-mode avalanche photodiodes*" by Hong Jin Kong, Tae Hoon Kim, Sung Eun Jo, and Min Seok Oh, Optics Express Vol. 19, Issue 20, pp. 19323-19329 (2011), "*A real-time noise filtering strategy for photon counting 3D imaging lidar*", by Zijing Zhang, Yuan Zhao, Yong Zhang, Long Wu, and Jianzhong Su, Optics Express Vol. 21, Issue 8, pp. 9247-9254 (2013), "*Low Intensity LiDAR using Compressed Sensing and a Photon Number Resolving Detector*", Yoni Shera, Lior Cohen, Daniel Istrati, Hagai S. Eisenberg, Proc. SPIE 10546, Emerging Digital Micromirror Device Based Systems and Applications X, 105460J (22 Feb. 2018), "*Thresholded Quantum LIDAR—Exploiting Photon-Number-Resolving Detection*", Lior Cohen, Elisha S. Matekole, Yoni Sher, Daniel Istrati, Hagai S. Eisenberg, Jonathan P. Dowling, arXiv:1906.09615 [quant-ph], U.S. Pat. No. 6,200,818 B1, US 2018/259625 A1. WO 2018/129410 A1, US 2018/113202 A1.

Most of the prior art devices rely on a combination of the signals from a plurality of SPADs. While this allows increasing the signal to noise ratio, it still suffers from the issues related to the dead time of the various SPADs. Moreover, most the prior art devices do not operate in the range of 950 nm to 1700 nm.

SUMMARY OF THE INVENTION

The inventors have generally realized that some or all of the above problems can be solved by using a discrete amplification photon detector, in the following DAPD.

Generally speaking, a DAPD outputs an electrical pulse whose amplitude is dependent upon the number of photons incident upon the detector. By applying a predetermined threshold it is possible to achieve an increase in the signal to noise ratio of the detector thus solving problems related to the noise. Moreover, DAPDs have effectively no dead time, or a very short dead time compared to SPADs, thus also mitigating the problem related to the length of the dead time window.

An embodiment of the invention can relate to a lidar comprising an emitter and a receiver, wherein the receiver can comprise a discrete amplification photon detector, wherein the receiver can comprise a discriminator, wherein the discriminator can have an input connected to an output signal of the discrete amplification photon detector, and wherein the discriminator can be configured to output a signal indicating that the output signal of the discrete amplification photon detector is higher than a predetermined threshold.

Thanks to this implementation, owing to the possibility of the DAPD to output a signal which is a function of the number of photons detected, and by filtering those outputs which are lower than the predetermined threshold, it is advantageously possible to increase the signal-to-noise ratio of the lidar.

In some embodiments, the predetermined threshold can be dynamic, as a function of an input, wherein the input can comprise a moving speed of the lidar, and/or, wherein the input can comprise a value of the output signal of the discrete amplification photon detector, averaged across a predetermined time.

Thanks to this approach it is advantageously possible to adapt the threshold to the detecting conditions, which may allow an increase in precision and/or in signal-to-noise ratio and/or in the detection range, depending on the specific configuration.

In some embodiments, the discriminator can be configured to determine a time corresponding to a maximum value of the output signal.

Thanks to this approach, in the presence of an output signal having a variable amplitude, the detection of the maximum amplitude can be advantageously used to obtain a more precise measurement and/or better define a measurement window.

In some embodiments, the lidar can further comprise a controller for controlling at least an emission of the emitter, wherein the controller can control the emitter so as to emit a random, or pseudo-random, or predetermined pulse sequence.

Thanks to this implementation it is advantageously possible to recognize pulses from one another which may be useful to distinguish from successive pulses, so as to increase the detection range of the lidar, and/or to distinguish pulses among different lidar equipment operating in the same environment.

In some embodiments, the receiver can be configured to detect light having a wavelength in a range from 950 nm to 1700 nm, preferably at 1550 nm.

Thanks for this approach it is advantageously possible to implement a system which is safe to the human eye, in addition to being compatible with a wide array of commercially available components.

In some embodiments, the receiver can comprise optics, wherein the optics can comprise a filter for filtering light having a frequency lower than 950 nm and/or higher than 1700 nm, preferably having a frequency lower than 1500 nm and/or higher than 1600 nm.

Thanks for this approach it is advantageously possible to filter out light which may cause unwanted detection at the receiver.

BRIEF DESCRIPTION OF THE FIGURES

FIG. 4A schematically illustrates a physical implementation of a discrete amplification photon detector 4210;

FIG. 4B schematically illustrates an electrical schematic of the discrete amplification photon detector 4210;

FIG. 4C schematically illustrates a preferred positioning of the discrete amplification photon detector 4210 in use;

DETAILED DESCRIPTION OF PREFERRED EMBODIMENTS

Figures 1, 2, 3:
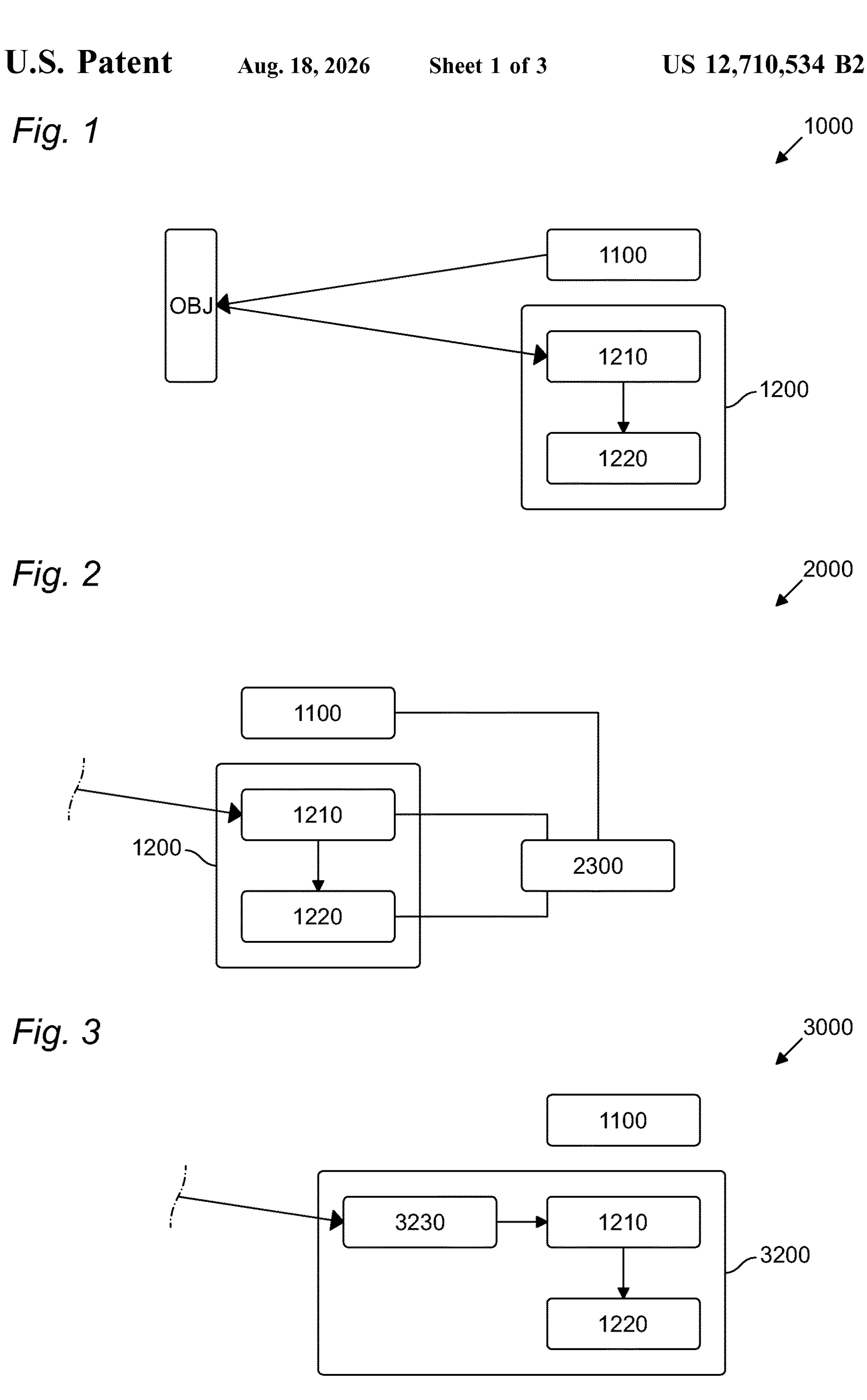
FIG. 1 schematically illustrates a lidar 1000.
FIG. 2 schematically illustrates a lidar 2000 comprising a controller 2300.
FIG. 3 schematically illustrates a lidar 3000 comprising optics 3230.

FIG. 1 schematically illustrates a lidar 1000. Lidar 1000 comprises an emitter 1100 and a receiver 1200.

The emitter 1100 could be, for instance, a laser emitter, potentially coupled with optics, as will be discussed in the following in particular with reference to emitter 5100. An exemplary embodiment of the laser could be an Erbium-doped fibre laser, for instance as commercially available from NuPhoton, model EDFL-Nano-1550-0.9-0.8 uJ-800 mW-FCA-02. In some embodiments, the laser can generate optical pulses with a wavelength comprised between 950 nm and 1700 nm, preferably of 1550 nm. This value is particularly advantageous because it is safe to the human eye. Moreover, this wavelength is generally used in telecom devices so that commercial off-the-shelf components are readily available. Additionally, solar spectral irradiance is comparatively low in this wavelength range than at visible wavelengths, which reduces the interference caused by sunrays on the operation of the lidar. Still further, atmospheric absorption is comparatively low at this wavelength, so that the lidar can reach longer distances with a given emission power. In some embodiments, the laser can emit light with a peak optical power comprised between 0.5 kW and 2 kW, preferably 1 kW.

The frequency of the emitted pulses is preferably chosen so as to avoid range ambiguity. In particular, return signal from a reflection will appear to be arriving from a distance less than the true range of the reflection, when arriving from a distance D $$D>[c/(2*PRF)]$$

wherein:

cis the speed of light;

PRF is the pulse repetition frequency.

So, for instance, for a lidar with a nominal range of 300 m, a maximum pulse repetition frequency of approximately 500 kHz must be used. Once the pulse repetition frequency is fixed, the maximum pulses duration is also fixed, although it will still be possible to use shorter pulses. Generally, the shorter the pulse length, the higher the precision of the lidar. In some practical embodiments, the pulses can have a width comprised between 100 ps and 2 ns, preferably between 200 ps and 1 ns, even more preferably 500 ps.

Using TCSPC (Time-Correlated Single Photon Counting), preferably jointly with other known technics, it is advantageously possible to increase the repetition rate into the MHz range whilst still avoiding range ambiguity. The use of higher frequencies advantageously allows to increase signal-to-noise ratio for a given integration time, since the signal increases.

The receiver 1200 comprises a discrete amplification photon detector 1210. Thanks to this configuration, light emitted from emitter 1100 and reflected by the object OBJ is received by the discrete amplification photon detector 1210. Thanks to the high sensitivity of the discrete amplification photon detector 1210, which is capable of detecting as little as a single photon, it is possible to reliably operate the lidar with low amount of light being emitted by the emitter 1100 and/or to detect objects OBJ at greater distances with a given power for the emitter 1100. The object OBJ can be varied, comprising for instance objects along a road, for a vehicle application, or gas, for gas sensing applications.

In some embodiments, the discrete amplification photon detector 1210 can be implemented by the commercially available DAPD NIR 5×5 Array from Amplification Technologies.

The receiver 1200 further comprises a discriminator 1220, having an input connected to an output signal of the discrete amplification photon detector 1210. The discriminator 1220 is configured to output a signal indicating that the output signal of the discrete amplification photon detector 1210 is higher than a predetermined threshold.

It is firstly noted that the connection of the output of the discrete amplification photon detector 1210 and the input of the discriminator 1220 does not need to be direct. In some embodiments, for instance, additional electronic elements could be placed along the connection line, such as, for instance, amplifiers. For the implementation of the embodiment it is sufficient that the input of the discriminator 1220 receives a signal corresponding to, and/or based on, the output of the discrete amplification photon detector 1210.

In some embodiments, the discriminator 1220 operates by detecting an amplitude of the signal on its input and by providing an output with a first value if said amplitude is bigger than a predetermined amplitude threshold, or an output with a second value if said amplitude is smaller than a predetermined amplitude threshold. The discriminator 1220 can be implemented, for instance, by a differential amplifier having a positive input connected to the output of the discrete amplification photon detector 1210 and a negative input connected to the predetermined amplitude threshold. It will however be clear to those skilled in the art that numerous manners exist for implementing a circuit operating as described.

Thanks to this approach, when the output of the discrete amplification photon detector 1210 is below the predetermined amplitude threshold the output of the discriminator 1220 will not switch. This advantageously allows filtering out signals from the discrete amplification photon detector 1210 indicating a number of photons below a predetermined photon threshold. Such low signals are mostly resulting from noise, from ambient light or dark counts, or haze or fog, which scatters the laser light back to the detector. By filtering them through the discriminator 1220, the signal to noise ratio of the receiver 1200 can be advantageously increased such that, for instance, a strong lidar signal from a solid target can be seen on a background of fog-scattered laser light, thus improving performance in poor visibility scattering environments. This can also be particularly advantageous in gas sensing applications, in which the reflected signal can be very low, so that an increase in signal-to-noise ratio is highly beneficial.

In some embodiments, the predetermined amplitude threshold value can be selected to correspond to a predetermined photon threshold value. That is, amplitude of the output of the discrete amplification photon detector 1210 is a function of the number of photons impinging on the discrete amplification photon detector 1210, so that an output amplitude value is a function of the input number of photons. The predetermined amplitude threshold value can then be selected to correspond to a predetermined photon threshold value of at least 1.5 photons, preferably at least 3.5. In some embodiments, if it is only possible to evaluate the amplitude of the receiver 1200 based on an integer number of input photons, a predetermined amplitude such as 1.5 can be computed based on a linear interpretation of the amplitude output at the lower and higher integer number of photons.

On the other hand, when the output of the discrete amplification photon detector 1210 rises above the predetermined amplitude threshold, the output of the discriminator 1220 can switch from the first value to the second value, indicating the change in the output of the discrete amplification photon detector 1210.

In some other embodiments, the discriminator 1220 can operate by integrating an amplitude of the signal on its input over a predetermined time. The discriminator can then provide an output with a first value if the result of the integration is higher than a predetermined amplitude threshold or an output with a second value if the result of the integration is lower than a predetermined amplitude threshold. This is particularly advantageous when photons reflected from the same object arrive at slightly different times, even though they belong to the same pulse. This may happen, for instance, if a detection pulse of the receiver 1200 is shorter than an emission pulse of the emitter 1100. In this case, the instantaneous amplitude outputted by the receiver 1200 can be lower than the predetermined amplitude threshold, and thus be discarded as noise. On the other hand, by integrating the output of the receiver 1200 it is possible to correctly detect that the photons belong to the same emission pulse. In some embodiments, the predetermined integration time can thus have a minimum value corresponding to the length of the emission pulse of the emitted 1100. A maximum value of the predetermined integration time can be selected depending on the precision requirements of the lidar. In some practical embodiments, the predetermined integration time can be at least 5 ns, preferably 10 ns.

As it is apparent, the invention allows not only filtering of low-strength signals, so as to increase the signal-to-noise ratio, but it also allows the amplitude of the output signal to be evaluated. This is particularly advantageous in that it allows the lidar not only to gather information on the presence or absence of a reflection, but also on the amount of light reflected, that is, on the characteristics of the reflection. This is particularly advantageous in that algorithms for obstacle detections can benefit from the additional given information on reflectivity and can improve their accuracy.

In addition, in some embodiments, the predetermined amplitude threshold applied by the discriminator 1220 can be dynamic, that is variable as a function of an input, as opposed to the previously described static values.

The input can be, in some embodiments, the moving speed of the lidar. In particular by decreasing the amplitude threshold as the speed increases and/or by increasing the amplitude threshold as the speed decreases. At higher speed, typical of a non-urban use, this can allow a better detection at longer distances, which generally result in a lower reflection, while the potential increase of the signal-to-noise ratio can be compensated by a reduced need for precision in this environment. Conversely, at lower speed, the increase in the threshold can allow an increased precision, needed for an urban environment, at the expense of some long-range visibility. In some embodiments, a minimum amplitude threshold can be set to be an equivalent predetermined photon threshold value of at least 1.5 photons.

Alternatively, or in addition, the input can be the value of the output signal of the discrete amplification photon detector 1210, averaged across a predetermined time. In particular by increasing the amplitude threshold as the value of the output signal increases and/or by decreasing the amplitude threshold as the value of the output signal decreases. This allows making advantageous use of a better reflection, resulting in an increased value of the output signal, by increasing the threshold so as to increase the signal-to-noise ratio. Conversely, in case of a reduced value of the output signal, for instance in case of fog or other environmental causes, a lower signal-to-noise ratio may be accepted in order to obtain a signal from the lidar.

In some embodiments, the discriminator 1220 is further configured to determine a time corresponding to a maximum value of the output signal. That is, the signal outputted by the receiver 1200 is likely to have a non-constant shape, with at least one maximum value. The discriminator 1220 can therefore be used not only to determine if the value is above the predetermined threshold, but also the time at which the maximum value occurs.

This information can be particularly useful for several reasons. In some embodiments, the maximum value could be used, instead of other timing values of the pulse outputted by the receiver 1200, in order to compute the distance of the object which caused the reflection. Alternatively, or in addition, the maximum value could be used as central value of the integration interval described above. This is particularly advantageous in that it improves the position of the integration window so that the outcome of the integration operation can be more reliable. Moreover, depending on signal's amplitude, given a fixed threshold, the detection time will shift. This shift can be compensated by knowing the maximum of the peak. Therefore, the detection of the maximum and the detection time allows for the shift correction.

It will be clear that, although the function above has been described as being carried out by the discriminator, it could also be possible to implement another, separate, element for the purpose of determining the timing of the maximum value of the output signal.

FIG. 2 schematically illustrates a lidar 2000 comprising a controller 2300. The controller controls at least the emission of the emitter 1100 and the output of the receiver 1200, so as to compute a time of flight of the pulse emitted by the emitter 1100 and received by the receiver 1200 in order to compute the distance to the object OBJ which reflected the pulse.

In some embodiments, the controller 2300 is configured to evaluate the output of the receiver 1200 only in a predetermined time window with respect to the emission time of the emitter. That is, defining t0 as the emission time of the emitter 1100, the controller is configured to evaluate as reflection an output of the receiver 1200 received between t1 and t2. This approach is particularly advantageous, for instance, in order to avoid detecting as reflection to the pulse at t0 a reflection to a previous or subsequent pulse. This is generally referred to as "time gating" of the receiver 1200.

This is particularly advantageous in foggy, dusty, or similar conditions, where a significant part of the reflected signal is backscatter from particles. This backscatter signal may result in a dead-time of the receiver 1200 which, even if contained, due to the high value of the backscatter, may reduce the sensitivity of the receiver 1200 at a time at which the reflection of an object is receiver. In order to avoid this, the controller 2300 can configured to evaluate as reflection an output of the receiver 1200 received between t1 and t2. In some embodiments, t1 may be t0, namely the time of emission by the emitter, plus a predetermined time. The predetermined time can be at least 50 ns, preferably at least 100 ns. In some embodiments, t2 may be t0, namely the time of emission by the emitter, plus a predetermined time. The predetermined time can be at most 400 ns, preferably at most 300 ns.

Those values have been found to be particularly advantageous in practical embodiments. In particular, the maximum value of t2 limits the distance at which the lidar can detect objects to a value sufficient for most applications. On the other hand, the minimum value of t1, though removing the possibility of detection in the immediate proximity of the lidar, is not particularly limiting since this range is likely to have been imaged by the lidar, moving forward, in a previous scan. At the same time, this is the range which is likely to cause the highest level of scattering, so that removing this scattering by imposing a minimum value of t1, may be particularly advantageous.

In some embodiments, alternatively or in addition to the controller 2300 being configured to evaluate as reflection an output of the receiver 1200 received between t1 and t2, it may be possible to enable the receiver only between t1 and t2. This is particularly advantageous, since it avoids that a reflection due to backscattering may cause a dead-time at the receiver 1200. This can be done, in some embodiments, by varying a bias voltage of the receiver 1200. For instance, with reference to the embodiment illustrated in FIG. 4B, this can be achieved by varying voltage V1 In particular, the bias voltage can be set to a first predetermined value, at which the receiver 1200 does not detect photons, before t1 and after t2. Conversely, the bias voltage can be set to a second predetermined value, at which the receiver 1200 does detect photons, between t1 and t2.

Moreover, in some embodiments, the use of a discrete amplification photon detector as receiver 1200 allows a particularly reduced dead time in the detection operation. This, in turn, allows the controller 2300 to use a fast, preferably arbitrary, pulse train to encode the laser pulses emitted by the emitter 1100. In particular, in some embodiments, the controller 2300 can control the emitter 1100 so as to emit a random, or pseudo-random, or predetermined pulse sequence. The use of such pulse sequence instead of a single pulse can further be specific to a given lidar. This can mitigate cross-talk/interference between vehicles or gas sensing equipment comprising the lidar. The low dead-time of the discrete amplification photon detector as receiver 1200 allows this to be done effectively. In some embodiments, the pulse sequence may have the characteristics previously described for the single pulse, in particular the complete pulse sequence may have a duration between 100 ps and 2 ns, preferably between 200 ps and 1 ns, even more preferably 500 ps. The random or pseudo-random variation of the pulse sequence can be expressed by the number and/or duration of the pulses within the pulse sequence.

Moreover, the low dead time allows resolving objects, or different parts of the same object, that are close together in range. This is particularly advantageous for applications where range profiling, that is making a 3D picture of one or more objects, is required. This is, for instance, particularly advantageous in the aerospace and defence sector, where the lidar may be used to identify potential enemy aircraft. In some embodiments, the receiver 1200 can be configured to detect light having a frequency in a range from 950 nm to 1700 nm, preferably at 1550 nm. In general, the receiver 1200 preferably has a detection range which is at least partially overlapping, preferably completely overlapping, the emission range of the emitter 1100. This is advantageously possible thanks to the implementation of the receiver 1200 by means of a discrete amplification photon detector.

FIG. 3 schematically illustrates a lidar 3000 comprising optics 3230. The optics 3230 can generically operate as a filter and/or as a lens.

In some embodiments, the optics 3230 comprise a filter for filtering light having a frequency lower than 950 nm and/or higher than 1700 nm, preferably having a frequency lower than 1500 nm and/or higher than 1600 nm. This can be achieved, for instance, by the combination of a low-pass and a high-pass filter, or by a band-pass filter. In some embodiments, the bandpass filter preferably has a bandwidth of 1 nm to 10 nm. In some embodiments, the filter may have a bandwidth corresponding the emission bandwidth of the emitter 1100.

In some embodiment, the optics 3230 comprise a lens for converging light from a predetermined angle onto the discrete amplification photon detector 1210. It will be clear to those skilled in the art how to select an appropriate converging lens, given the dimensions of the discrete amplification photon detector 1210 and the distance from the lens. The angle is preferably measured along the vertical direction. The angle bisector preferably corresponds to the horizontal direction.

Figures 4A, 4B, 4C:
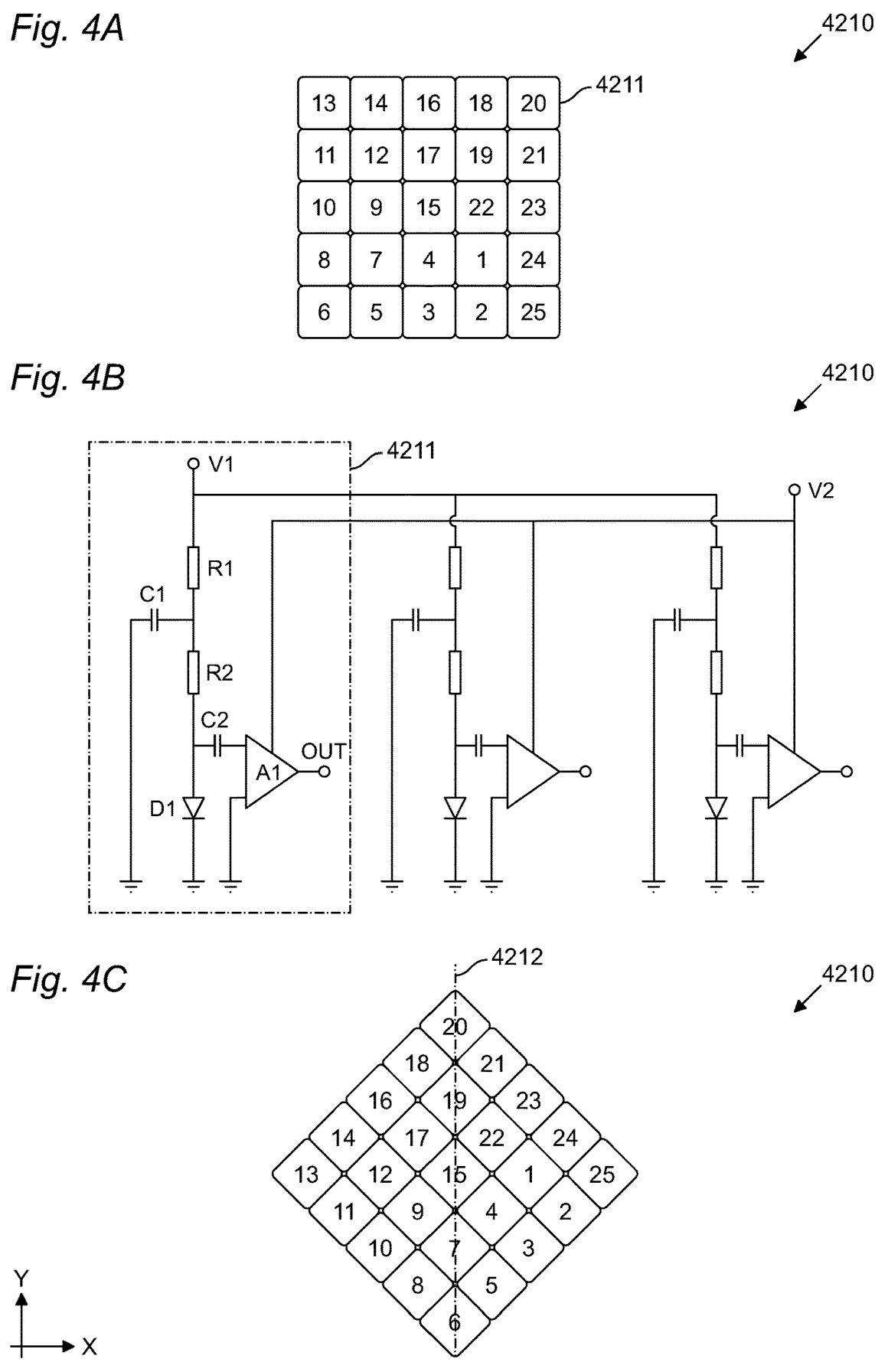

FIG. 4A schematically illustrates a physical implementation of a discrete amplification photon detector 4210, which can be used to implement one or more discrete amplification photon detector 1210.

The discrete amplification photon detector 4210 comprises a plurality of pixels 4211 arranged in a matrix of N rows by M columns, wherein N is comprised between 1 and 1064, preferably between 1 and 64, and wherein M is comprised between 1 and 1064, preferably between 1 and 64. Each pixel 4211 can implement a discrete amplification photon detector 1210. The use of several pixels at the same time provides a faster data acquisition than scanning the field with a single pixel. In the illustrated embodiment, the discrete amplification photon detector 4210 comprises 5 rows and 5 columns for a total of 25 pixels 4211. The pixels have been numbered for ease of description, as will become clearer with respect to FIG. 4C. It will be clear that this is for explanation purposes only and the invention is not limited to this specific configuration.

Each of the pixels 4211 is capable of detecting light from a single photon and from a plurality of photons, as described above. Moreover, each of the pixels 4211 is capable of outputting an output signal which is a function of the number of photons detected by the pixel 4211. In this respect, each of the pixels 4211 acts a single discrete amplification photon detector, thus having the capability of implementing the functionality described for discrete amplification photon detector 1211.

The plurality of pixels allows imaging a broader image. That is, thanks to the optics 3230 using a plurality of pixels 4211 can obtain a broader detection angle. This advantageously allows for lidar architectures such as flash lidar, where the whole scene is illuminated in one flash and a static receiver observes everything, or hybrid flash/scanning.

Moreover, the output of at least two pixels 4211 can be combined in a particularly advantageous manner in order to increase the signal quality of the lidar. In particular, it is possible to combine the output of several discriminators 1220, each connected to its own pixel 4211, that is, to its own receiver 1200. In this manner, at the level of the single pixel 4211 and the respective discriminator 1220, the same effects in increase in signal-to-noise ratio as previously described can be obtained. Moreover, the output of those discriminators 1220 can be combined to further increase the signal-to-noise ratio of the lidar.

In some embodiments, the combination of the plurality of outputs of the discriminators 1220 can be, for instance, a majority function. That is, the combined output of the discriminators 1220 can correspond to the value having the highest appearance among the various output of the various discriminators 1220.

Alternatively, or in addition, in some embodiments, the combination of the plurality of outputs of the discriminators 1220 can be, for instance, an average function. That is, the combined output of the discriminators 1220 can correspond an average of the various output of the various discriminators 1220

FIG. 4B schematically illustrates an electrical schematic of the discrete amplification photon detector 4210. In particular, FIG. 4B schematically illustrates three pixels, one of which, pixel 4211 is indicated. Each pixel is provided with an output signal OUT which can be connected to a respective discriminator. In some embodiments, practical values of the R, R2, C1 and C2 components can be selected to be between 1 kΩ and 100 kΩ for R1 and/or, and between 1 nF and 100 nF for C1 and/or C2.

FIG. 4C schematically illustrates a preferred positioning of the discrete amplification photon detector 4210 in use. In particular, as it can be seen comparing FIGS. 4A and 4C, the discrete amplification photon detector 4210 can be positioned with its diagonal 4212 substantially corresponding to a direction in which the emitter 1100 has a diverging emission. Alternatively, or in addition, in case the emitter 1100 has a diverging emission along more than one direction, the discrete amplification photon detector 4210 is positioned with its diagonal 4212 substantially corresponding to the direction in which the emitter 1100 has the most diverging emission. In some embodiments, for instance in the embodiment described with reference to FIG. 5 below, the emitter 5100 has a diverging emission substantially along the vertical axis. In such embodiments, as illustrated in FIG. 4C, the diagonal 4212 of the discrete amplification photon detector 4210 is placed vertically, along vertical axis Y.

In some embodiments, the direction of the diverging emission of the emitter 1100 can be changed by optics, such as lenses and/or mirrors. For instance, the emitter 1100 can emit light with a single diverging direction along the horizontal axis. This can then be rotated, for instance by 90 degrees, at the emitter, by optics, so as to emit light with a single diverging direction along the vertical axis. This emitted light, reflected by the object OBJ, can then be rotated again at the receiver, for instance by 90 degrees, so that the diverging direction of the light received at receiver is again substantially corresponding to the horizontal axis.

Therefore, as a generalization of the concept described above, in such embodiments, it will be understood that the matrix of N rows by M columns has a diagonal 4212 and the emitter 1100 is configured to emit light with a diverging direction, or with a maximum diverging direction, along a first predetermined direction. The diagonal 4212 then corresponds to a projection, on the discrete amplification photon detector 4210, of light emitted by the emitter 1100 along the first predetermined direction. In other words, the discrete amplification photon detector 4210 can be positioned so that its diagonal corresponds to the diverging direction of the light from the emitter 1100 once such light is reflected and reaches the discrete amplification photon detector 4210.

Figure 5:
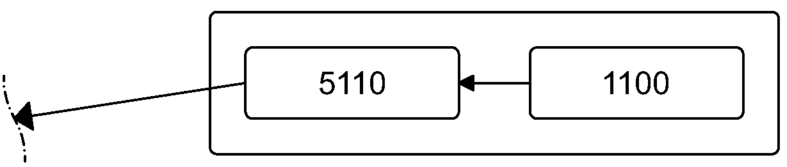
FIG. 5 schematically illustrates an emitter 5100 comprising optics 5110.

FIG. 5 schematically illustrates an emitter 5100 comprising optics 5110 in addition to emitter 1100. In particular, the optics 5110 are positioned such that the signal emitted by the emitter 1100 passes through the optics 5110.

In some embodiments, the optics 5110 may comprise lenses configured to provide an output optical signal substantially collimated in the horizontal axis and diverging in the vertical axis, preferably with an angle of 1 degree to 2.6 degrees, preferably 1.8 degrees. The angle is preferably measured along the vertical direction. The angle bisector preferably corresponds to the horizontal direction. The advantage of this approach is that it allows to directly scanning a vertical area of a predetermined size. It has been found that those specific values further advantageously allow scanning an area which provides significant and sufficient information for autonomous driving applications, while avoiding a too large area being scanned. The scanning in the horizontal direction can then be achieved by changing the output direction of the output optical signal, for instance by means of a mirror, preferably a rotating mirror, in a known manner.

Although various embodiments have been described and/or illustrated independently, each comprising one or more features, it will be clear that the invention is not limited to the specifically described and/or illustrated embodiments. In addition, it will be possible to combine one or more features, from one or more embodiments, without necessarily comprising all features from the respective embodiments, so as to obtain alternative embodiments of the invention.

LIST OF REFERENCE NUMERALS

1000: lidar
1100: emitter
1200: receiver
1210: discrete amplification photon detector
1220: discriminator
OBJ: object
2000: lidar
2300: controller
3000: lidar
3200: receiver
3230: optics
4210: discrete amplification photon detector
4211, 1-25: pixel
4212: diagonal
A1: amplifier
C1, C2: capacitor
D1: diode
OUT: output
R1, R2: resistance
V1, V2: voltage bias
5100: emitter
5110: optics

The invention claimed is:

1. A lidar (1000, 2000, 3000) comprising an emitter (1100, 5100) and a receiver (1200, 3200),
wherein the receiver (1200, 3200) comprises a discrete amplification photon detector (1210, 4210),
wherein the receiver (1200, 3200) comprises a discriminator (1220),
wherein the discriminator (1220) has an input connected to an output signal of the discrete amplification photon detector (1210, 4210),
wherein the discriminator (1220) is configured to output a signal indicating that the output signal of the discrete amplification photon detector (1210, 4210) is higher than a predetermined threshold,
wherein the predetermined threshold is dynamic, as a function of an input, and
wherein the input comprises a moving speed of the lidar.

2. The lidar (1000, 2000, 3000) according to claim 1,
wherein the input also comprises a value of the output signal of the discrete amplification photon detector (1210, 4210), averaged across a predetermined time.

3. The lidar (1000, 2000, 3000) according to claim 1,
wherein the discriminator (1220) is configured to determine a time corresponding to a maximum value of the output signal.

4. The lidar (1000, 2000, 3000) according to claim 1,
further comprising a controller (2300) for controlling at least an emission of the emitter (1100, 5100),
wherein the controller (2300) controls the emitter (1100) so as to emit a random, or pseudo-random, or predetermined pulse sequence.

5. The lidar (1000, 2000, 3000) according to claim 1 wherein the receiver (1200, 3200) is configured to detect light having a wavelength in a range from 950 nm to 1700 nm.

6. The lidar (3000) according to claim 1
wherein the receiver (3200) comprises optics (3230), wherein the optics (3230) comprise a filter for filtering light having a frequency lower than 950 nm and/or higher than 1700 nm.

7. The lidar according to claim 5,
wherein the receiver is configured to detect light having a wavelength of 1550 nm.

8. The lidar according to claim 6,
wherein the receiver comprises optics, wherein the filter for filtering light has a frequency lower than 1500 nm.

9. The lidar according to claim 6,
wherein the receiver comprises optics, wherein the filter for filtering light has a frequency higher than 1600 nm.

* * * * *